US008682737B2

(12) United States Patent (10) Patent No.: US 8,682,737 B2
Waksmundzki et al. (45) Date of Patent: Mar. 25, 2014

(54) UNIVERSAL BUSINESS TO MEDIA TRANSACTION SYSTEM, PROCESS AND STANDARD

(75) Inventors: Jacek Waksmundzki, Warsaw (PL); Pawel Demczuk, Warsaw (PL); Lukasz Michalski, Warsaw (PL)

(73) Assignee: Jacek Waksmundzki, Warsaw (PL)

( * ) Notice: Subject to any disclaimer, the term of this patent is extended or adjusted under 35 U.S.C. 154(b) by 570 days.

(21) Appl. No.: 12/427,888

(22) Filed: Apr. 22, 2009

(65) Prior Publication Data

US 2009/0265254 A1 Oct. 22, 2009

Related U.S. Application Data

(63) Continuation-in-part of application No. 12/255,256, filed on Oct. 21, 2008, and a continuation-in-part of application No. 12/255,344, filed on Oct. 21, 2008, and a continuation-in-part of application No. 12/255,417, filed on Oct. 21, 2008.

(60) Provisional application No. 60/981,710, filed on Oct. 22, 2007, provisional application No. 60/981,722, filed on Oct. 22, 2007, provisional application No. 60/981,732, filed on Oct. 22, 2007.

(51) Int. Cl.
*G06Q 30/00* (2012.01)
*G06Q 10/00* (2012.01)

(52) U.S. Cl.
USPC .......................................... 705/26.1; 705/348

(58) Field of Classification Search
None
See application file for complete search history.

(56) References Cited

U.S. PATENT DOCUMENTS 4,972,504 A 11/1990 Daniel, Jr. et al.
5,915,001 A * 6/1999 Uppaluru ................... 379/88.22
(Continued)

FOREIGN PATENT DOCUMENTS

| WO | 2004/019223 A1 | 3/2004 |
| WO | 2004/104888 A1 | 12/2004 |
| WO | 2005/004013 A1 | 1/2005 |
| WO | 2005/116883 A1 | 8/2005 |

OTHER PUBLICATIONS

Office Action. First Inventor: Waksmundzki, Jacek. U.S. Appl. No. 12/255,256. Mailing Date. Sep. 27, 2010.

(Continued)

*Primary Examiner* — Paul Danneman
(74) *Attorney, Agent, or Firm* — Marsh Fischmann & Breyfogle LLP

(57) ABSTRACT

A computer network based universal transaction system (CN-BUTS) architecture that enables transaction between one or more offer providers and one or more customers relating to offers of wares (e.g., goods/services) by the offer providers. In one embodiment, the architecture of the CNBUTS includes a universal agent system, one or more offering systems and one or more marketplace systems. The universal agent system receives one or more offers of wares available for transactions. Each offering system enables offer providers to define the offer(s) of wares available for transaction. Each marketplace system receives the offer(s) of wares from the universal agent system, presents the customers the offer(s) of wares, receives transaction requests from the customers, and communicates received transaction requests to the universal agent system. The universal agent system communicates the offer(s) of wares from the offering system(s) to the marketplace system(s) and processes transaction requests received from the marketplace system(s).

23 Claims, 4 Drawing Sheets

(56) References Cited

U.S. PATENT DOCUMENTS

| | | |
|---|---|---|
| 5,926,798 A | 7/1999 | Carter |
| 6,085,169 A | 7/2000 | Walker et al. |
| 6,345,260 B1 | 2/2002 | Cummings, Jr. et al. |
| 6,553,346 B1 | 4/2003 | Walker et al. |
| 6,556,976 B1 | 4/2003 | Callen |
| 6,611,867 B1 | 8/2003 | Bowman-Amuah |
| 6,873,969 B2 | 3/2005 | Stone et al. |
| 6,904,449 B1 | 6/2005 | Quinones |
| 6,990,457 B1 | 1/2006 | Litman et al. |
| 7,016,857 B1 | 3/2006 | Lloyd et al. |
| 7,031,945 B1 | 4/2006 | Donner |
| 7,069,228 B1 | 6/2006 | Rose et al. |
| 7,162,436 B1 | 1/2007 | Eckel, Jr. |
| 7,174,303 B2 | 2/2007 | Glazer et al. |
| 7,188,158 B1 | 3/2007 | Stanton et al. |
| 7,272,575 B2 * | 9/2007 | Vega .............................. 705/80 |
| 7,328,166 B1 | 2/2008 | Geoghegan et al. |
| 7,330,826 B1 | 2/2008 | Porat et al. |
| 7,386,485 B1 | 6/2008 | Mussman et al. |
| 7,668,809 B1 | 2/2010 | Kelly et al. |
| 2001/0005831 A1 | 6/2001 | Lewin et al. |
| 2001/0047264 A1 | 11/2001 | Roundtree |
| 2001/0047311 A1 | 11/2001 | Singh |
| 2002/0029164 A1 | 3/2002 | Sugar et al. |
| 2002/0040352 A1 | 4/2002 | McCormick |
| 2002/0055903 A1 * | 5/2002 | Solomon ........................ 705/37 |
| 2002/0064149 A1 | 5/2002 | Elliott et al. |
| 2002/0069079 A1 | 6/2002 | Vega |
| 2002/0116234 A1 | 8/2002 | Nagasawa |
| 2002/0156641 A1 | 10/2002 | Kitajima |
| 2002/0156684 A1 | 10/2002 | Stone et al. |
| 2003/0004762 A1 | 1/2003 | Banerjee et al. |
| 2003/0005055 A1 | 1/2003 | Ralston et al. |
| 2003/0187773 A1 | 10/2003 | Santos et al. |
| 2003/0204444 A1 | 10/2003 | Van Luchene et al. |
| 2004/0122735 A1 | 6/2004 | Meshkin |
| 2004/0203944 A1 | 10/2004 | Huomo et al. |
| 2004/0249680 A1 | 12/2004 | Liew et al. |
| 2004/0267630 A1 | 12/2004 | Au et al. |
| 2005/0055252 A1 | 3/2005 | Todd |
| 2005/0136916 A1 | 6/2005 | Pines et al. |
| 2005/0171858 A1 | 8/2005 | Cotten et al. |
| 2005/0203809 A1 | 9/2005 | Stone et al. |
| 2005/0267787 A1 | 12/2005 | Rose et al. |
| 2005/0288973 A1 | 12/2005 | Taylor et al. |
| 2005/0288976 A1 | 12/2005 | Abrams et al. |
| 2007/0276727 A1 | 11/2007 | Thibedeau |
| 2008/0052189 A1 | 2/2008 | Walker et al. |
| 2008/0275741 A1 | 11/2008 | Loeffen |
| 2009/0036103 A1 | 2/2009 | Byerley et al. |
| 2009/0099929 A1 | 4/2009 | Thibedeau et al. |
| 2009/0104896 A1 | 4/2009 | Demczuk |
| 2009/0106055 A1 | 4/2009 | Demczuk et al. |
| 2009/0106056 A1 | 4/2009 | Waksmundzki et al. |
| 2009/0106073 A1 | 4/2009 | Waksmundzki et al. |
| 2009/0106074 A1 | 4/2009 | Waksmundzki et al. |
| 2009/0106109 A1 | 4/2009 | Waksmundzki et al. |
| 2009/0106121 A1 | 4/2009 | Waksmundzki et al. |
| 2009/0106654 A1 | 4/2009 | Waksmundzki et al. |
| 2009/0259545 A1 | 10/2009 | Demczuk |
| 2009/0265194 A1 | 10/2009 | Waksmundzki et al. |

OTHER PUBLICATIONS

Office Action. First Inventor: Waksmundzki, Jacek. U.S. Appl. No. 12/255,344. Mailing Date. Sep. 27, 2010.

Office Action. First Inventor: Demczuk, Pawel. U.S. Appl. No. 12/255,444. Mailing Date. Oct. 5, 2010.

Office Action. First Inventor: Waksmundzki, Jacek. U.S. Appl. No. 12/255,484. Mailing Date. Oct. 6, 2010.

Office Action. First Inventor: Waksmundzki, Jacek. U.S. Appl. No. 12/255,504. Mailing Date. Oct. 6, 2010.

Office Action. First Inventor: Waksmundzki, Jacek. U.S. Appl. No. 12/255,513. Mailing Date. Oct. 5, 2010.

Waksmundzki et al. Office Action. U.S. Appl. No. 12/255,417. Mail Date: Apr. 29, 2011.

Waksmundzki et al. Office Action. U.S. Appl. No. 12/427,866. Mail Date: May 11, 2011.

* cited by examiner

UNIVERSAL BUSINESS TO MEDIA TRANSACTION SYSTEM, PROCESS AND STANDARD

RELATED APPLICATION INFORMATION

This application is a continuation in-part of and claims priority from U.S. patent application Ser. No. 12/255,256 entitled "UNIVERSAL BUSINESS TO MEDIA TRANSACTION SYSTEM" filed on Oct. 21, 2008, which application claims priority from U.S. Provisional Patent Application Ser. No. 60/981,710 entitled "UNIVERSAL BUSINESS TO MEDIA TRANSACTION SYSTEM" filed on Oct. 22, 2007, U.S. patent application Ser. No. 12/255,344 entitled "BUSINESS TO MEDIA TRANSACTION STANDARD" filed on Oct. 21, 2008, which application claims priority from U.S. Provisional Patent Application Ser. No. 60/981,722 entitled "BUSINESS TO MEDIA TRANSACTION STANDARD" filed on Oct. 22, 2007, and U.S. patent application Ser. No. 12/255,417 entitled "BUSINESS TO MEDIA TRANSACTION BUSINESS PROCESS" filed on Oct. 21, 2008, which application claims priority from U.S. Provisional Patent Application Ser. No. 60/981,732 entitled "BUSINESS TO MEDIA TRANSACTION BUSINESS PROCESS" filed on Oct. 22, 2007, the entire disclosures of which are incorporated by reference herein in their entirety.

FIELD OF THE INVENTION

The present invention relates generally to facilitating transactions among customer and offer providers, and more particularly to brokering of transactions relating to any goods or services in any business domain using multiple analog and digital media.

BACKGROUND OF THE INVENTION

The Internet and other computer networks have proven to be a useful medium for connecting those who offer goods or services with persons seeking to obtain goods or services. For example, a patient might utilize the Internet to access their doctor's office Web site to schedule an appointment, a driver might access a car rental agency's Web site via the Internet to reserve a rental car, or a diner might utilize the Internet to access a restaurant's Web site to obtain a dinner reservation. In other examples, a person might order a pair of skis from a ski shop or an automobile part from an automobile parts dealer. In each of the foregoing examples, the ordering/scheduling function is integrated with the system that presents information about the available good/service. Furthermore, access to the system that presents information about the available goods/services may be limited to particular marketplaces. For example, the doctor's office, car rental agency's, restaurant's, ski shop's or parts dealer's Web site might be accessible via a Web portal, but not via a mobile phone portal or a digital television system. Additionally, the customers seeking goods/services may be presented with a myriad of different ordering/scheduling systems and processes in order to order/reserve a variety of differing goods/services since the customers directly interface with the offering systems.

SUMMARY OF THE INVENTION

Accordingly, the present invention provides for a computer network based universal transaction system (CNBUTS). The CNBUTS provides easy brokering of transactions relating to wares between customers and offer providers. In general, a "ware" is any good or service that an individual or an entity may reserve, schedule, order, buy, purchase, sell, deliver, provide, receive, rent, lease, or the like from/to another. The terms "ware" and "good/service" may be used interchangeably herein. In general, a "customer" is any individual or entity that may reserve, schedule, order, buy, purchase, receive, rent, lease, or the like a good or service. The terms "customer" and "buyer/client" may be used interchangeably herein. Further, a "transaction" refers to any activity involving a good or service including reserving, scheduling, ordering, buying, purchasing, selling, delivering, providing, receiving, renting, leasing, or the like of a good or service.

The present invention provides universality by allowing for the inclusion of every customer who desires to participate and every offer provider who desires to participate through every analog and digital media (e.g. newspaper, billboard, Internet, ITV, cell phone, PDA, etc.) and through multiple marketplaces that desire to participate (e.g., universal portals, linked services portals, specialty portals, media portals, etc.).

The CNBUTS includes a number of components that communicate with one another via computer networks. The computer networks may, in general, be any public network(s), any private network(s), or any combination of public and private network(s) that provide for the communication of data between devices connected to the network(s). Examples of such computer network(s) include the Internet, private switched telephone networks, cellular telephone networks, cable and satellite television networks, wireless networks, and the like.

The present invention includes various aspects and features. In one aspect, a computer network based universal transaction system enabling one or more customers to conduct transactions with one or more offer providers, wherein the transactions relate to wares offered by the offer providers, includes a universal agent system, one or more offering systems and one or more marketplace systems. The universal agent system includes at least one processor, at least one computer network connection and computer program instructions executable by the processor(s) included in the universal agent system that enable the universal agent system to receive one or more offers of wares available for transaction via the computer network connection(s) included in the universal agent system. Each offering system includes at least one processor, at least one computer network connection and computer program instructions executable by the processor(s) included in the offering system that enable offer providers to define one or more offers of wares available for transaction with customers and make the one or more offers of wares available to the universal agent via the computer network connection(s) included in each offering system. In this regard, an offer of wares includes a delegation by the offer provider that specifies whether the universal agent system is delegated authority to complete transactions with customers relating to the offer of wares. Each marketplace system is associated with a marketplace and includes at least one processor, at least one computer network connection and computer program instructions executable by the processor(s) included in the marketplace system that enable the marketplace system to receive via the computer network connection(s) the one or more offers of wares from the universal agent system, present the customers the one or more offers of wares, receive transaction requests from the customers relating to the one or more offers of wares, and communicate received transaction requests to the universal agent system. The computer program instructions executable by the processor(s) of the universal agent system further enable the universal agent system to conduct a transaction process wherein the universal agent system communicates the one or more offers of wares from the offering system(s) to the marketplace system(s) to provide a connection among the offer providers and marketplaces by which marketplaces are provided schedulable time periods relating to wares from multiple offer providers and wherein the universal agent system processes transaction requests received from the marketplace system(s) to transform the requests into transactions for delivery of wares by the offer providers to the customers.

In another aspect, a method for facilitating transactions of wares between customers and offer providers includes the step of conducting an offer construction process involving one or more offer providers and a universal agent supplier. The one or more offer providers offer wares available for transaction with customers using an offering system and the universal agent supplier provides a universal agent system to which offers of wares are communicated. The offering system includes at least one processor, at least one computer network connection and computer program instructions executable by the processor(s) included in the offering system, and the universal agent system includes at least one processor, at least one computer network connection and computer program instructions executable by the processor(s) included in the universal agent system that enable the universal agent system to receive the offers of wares via the computer network connection(s). The method also includes the step of conducting a marketplace construction process involving one or more marketplace suppliers and the universal agent supplier. The one or more marketplace suppliers provide one or more marketplace systems and one or more media for customer communication with the marketplace systems. Each marketplace system is associated with a marketplace and includes at least one processor, at least one computer network connection and computer program instructions executable by the processor(s) included in the marketplace system that enable the marketplace system to receive via the computer network connection(s) the offers of wares from the universal agent system, present the customers the offers of wares, receive transaction requests from the customers relating to the offers of wares, and communicate received transaction requests to the universal agent system. The method further includes the step of conducting a transaction process wherein a single universal agent operating separately from the marketplace(s) provides a connection among the offer providers and marketplaces by which marketplaces are provided information relating to the wares from multiple offer providers and processes transaction requests from customers relating to wares offered by the offer provider(s) on the marketplace system(s) and presented to the customers through the one or more media to transform the requests into transactions for delivery of wares by the offer providers to the customers.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1A:
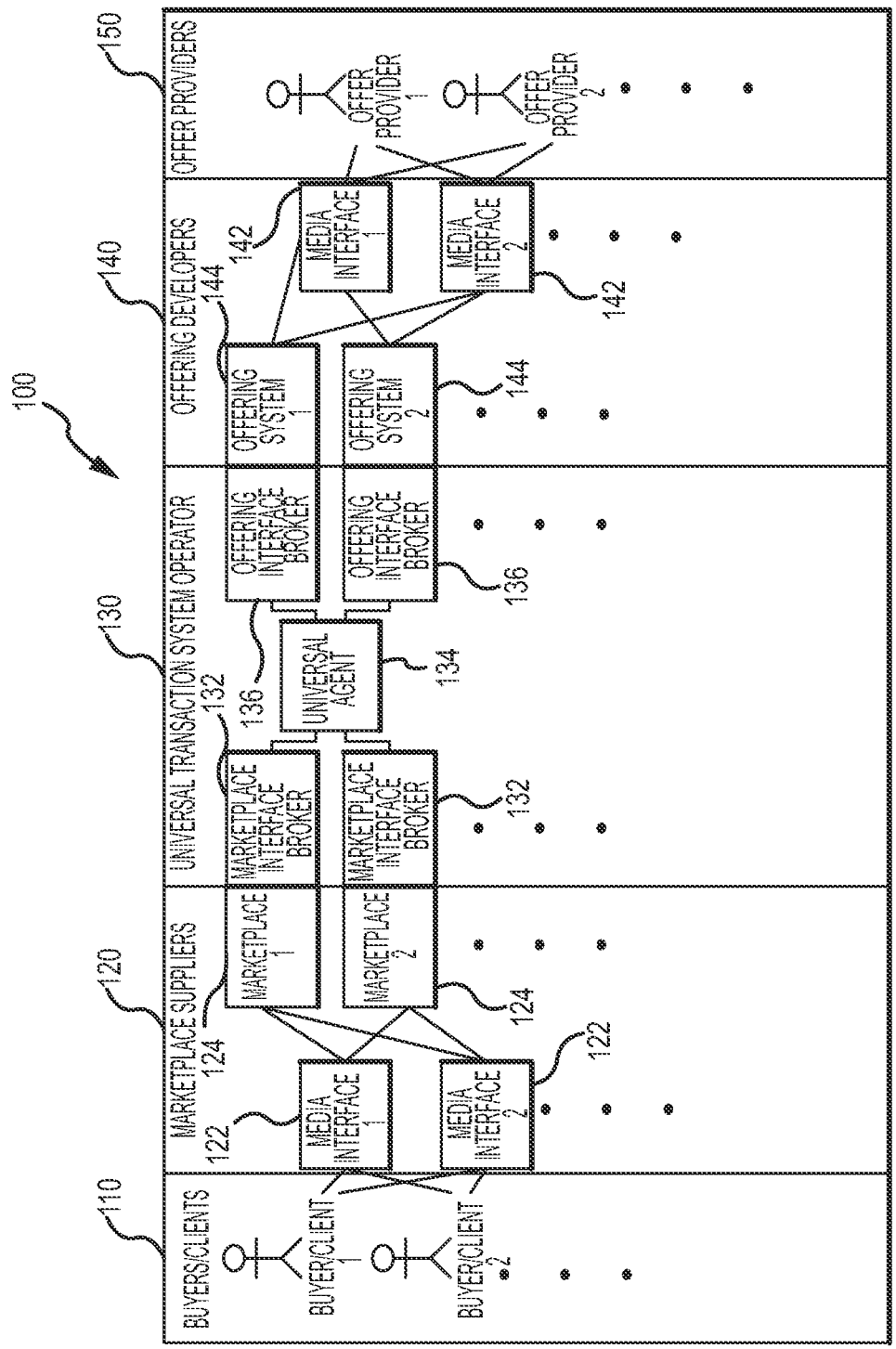
FIG. 1A is a block diagram showing one embodiment of a computer network based universal transaction system presenting involved actors and components.

FIG. 1A shows one embodiment of a computer network based universal transaction system (CNBUTS) 100. The CNBUTS 100 conforms to the business to media (B2M) transaction standard. In general, the B2M transaction standard specifies a standard that provides for the visualization of, and the buying, renting/scheduling of goods/services, simultaneously, in real time, and over multiple analog and digital media in multiple analog and digital marketplaces.

Figure 1B:
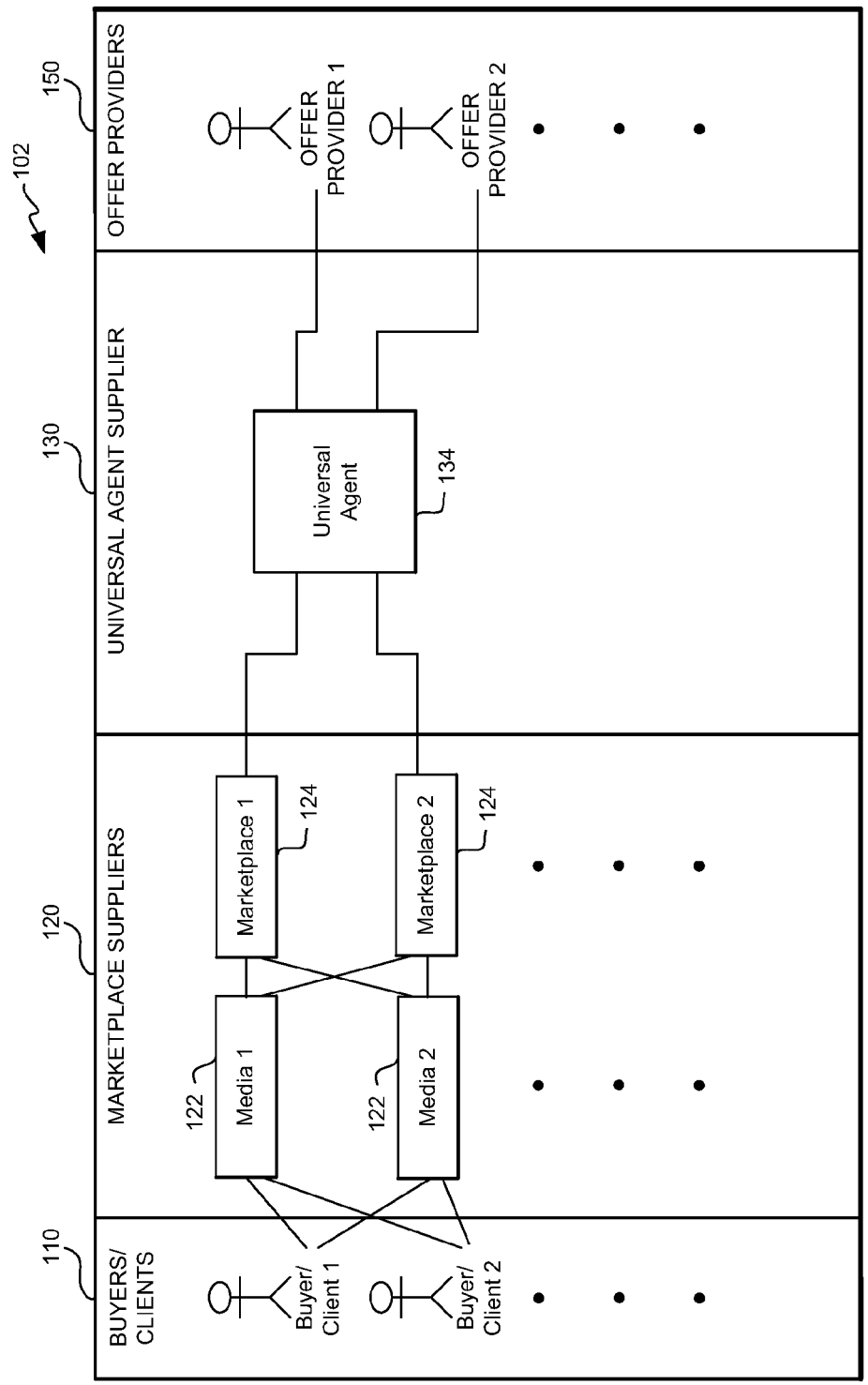
FIG. 1B is a block diagram showing a business environment with four groups of actors and three component types provided in accordance with the B2M transaction standard.

As shown in FIG. 1B, the B2M transaction standard specifies a model 102 that includes four (4) groups of actors and three (3) component types. The four groups of actors interacting in this model are: buyers/clients 110, marketplace suppliers 120, the universal agent supplier 130 and offer providers 150. Three component types used in the model are: media 122, marketplaces 124 and the universal agent 134. In accordance with the B2M transaction standard, the various actors and components undertake various roles and/or have various interactions. The marketplaces 124 may be implemented in any analog and/or digital forms where goods/services are available through any media 122 to the buyers/clients 110, including, for example, in one embodiment as computer network enabled computer systems. The universal agent 134 may be implemented in any machine implemented form capable of processing all kinds of transactions (e.g. buying, selling, renting, reserving, scheduling, etc.) of all kinds of goods/services, including, for example, in one embodiment as a computer network enabled computer system. The universal agent 134 has the capability to complete transactions from multiple marketplaces 124.

B2M Transaction Standard Roles

The role of the buyers/clients 110 is to request transactions (e.g., buy/reserve/schedule) of wares (goods/services) available on multiple marketplaces 124 through multiple media 122. There may be one, two or more buyers/clients 110.

The role of marketplace suppliers 120 is to provide marketplaces 124 in any area of perceived market need (e.g. computer shops, car shops, hair-dressers, ski rentals, hotels, etc.) in forms suitable to the buyers/clients 110. There may be one or more marketplace suppliers 120. The marketplaces 124 may be implemented in numerous machine implemented forms (e.g. WWW sites, DTV programs, mobile portals, etc.). Marketplace suppliers 120 also provide media 122 for communication by buyers/clients 110 with marketplaces 124. Media 122 include analog (e.g. analog phone, printed materials, etc.) and/or digital (e.g. Internet, mobile phones, digital TV, etc.) types.

The role of marketplaces 124 is to offer goods/services available from the universal agent 134 to the buyers/clients 110 and to mediate in transactions of those goods/services between the universal agent 134 and the buyers/clients 110. One, two or more marketplaces 124 may be provided by the marketplace suppliers 120.

The role of the media 122 is to enable one-way (e.g. billboards, newspapers, etc.) and two-way (e.g. Internet, mobile phones, etc.) communication between buyers/clients 110 and marketplaces 124. One, two or more media 122 may be provided by the marketplace suppliers 120.

The role of the universal agent supplier 130 is to provide the universal agent 134 in any machine implemented form (e.g. one or more computer systems). The universal agent 134 is responsible for exchanging information between offer providers 150 and marketplaces 124 in both directions and is responsible for handling transactions on behalf of the offer providers 150, if offer providers 150 decide to delegate transaction handling to the universal agent 134.

The role of the universal agent 134 is to pass a goods/service offer from the offer providers 150 to the marketplaces 124 and inform offer providers 150 about transaction requests from the marketplaces 124.

The role of offer providers 150 is to have an offer of goods/services, to give an access to those goods/services to the universal agent 134 and to handle transactions incoming from universal agent 134 or (optionally) fully delegate transactions to the universal agent 134. There may be one, two or more offer providers 150.

B2M Transaction Standard Interactions

The B2M transaction standard provides a business environment where three main interactions (Service offer construction, Marketplace construction, and Transaction process), which are described below, take place:

B2M Transaction Standard Service Offer Construction

The offer provider 150 defines goods/services, which will be available for transactions and describes those goods/services by naming their features such as: price, needed resources, place, etc. The offer provider 150 creates delegations by deciding which goods/services transactions the offer provider 150 will handle and which will be handled by the universal agent 134. The offer provider 150 adapts communication methods, provided by the universal agent supplier 130 for two-way communication between the offer provider 150 and the universal agent 134. When communication channels are established, the offer provider 150 places his offer and his delegations with the universal agent 134. The offer provider 150 does not have to be connected permanently to the universal agent 134, but in the case that offer provider 150 is not connected permanently to the universal agent 134, the goods/services without delegations may not be available to the buyers/clients 110. Goods/services without delegations may be available only when the offer provider 150 is connected to the universal agent 134.

B2M Transaction Standard Marketplace Construction

The marketplace supplier 120 establishes communication methods with the universal agent 134 and receives information about business domains available to the universal agent 134. The marketplace supplier 120 chooses at least one business domain and makes goods/services from this domain available to the buyers/clients 110 through at least one media 122. The marketplace 124 may stay permanently connected with universal agent 134 and presents to the buyers/clients 110 up to date offers with available goods/services only.

B2M Transaction Standard Transaction Process

The buyer/client 110 gets the information about the offers available on a marketplace 124 through a chosen media 122 that enables marketplace 124 to buyer/client 110 communication. If the chosen media 122 also supports a return communication channel, the buyer/client 110 uses it for making a transaction of a chosen good/service. When the chosen media 122 don't have a return channel, the buyer/client 110 uses other available media 122 with return communication capabilities to make this transaction. As the marketplace 124 stays connected to the universal agent 134, the transaction request is transmitted immediately from the marketplace 124 to the universal agent 134. If the universal agent 134 has been given delegation for the chosen goods/services, it accepts or refuses the transaction. If the universal agent 134 has not been given delegation for the chosen goods/services, the universal agent 134 informs the offer provider 150 about the transaction request and the offer provider 150 decides whether to accept it or refuse it. When the transaction status is set, the universal agent 134 informs the marketplace 124 about this status and the marketplace 124 makes this information available to the buyer/client 110.

Referring again to FIG. 1A, the CNBUTS 100 represents one possible implementation of the B2M transaction standard and it is done in digital and computer network enabled technology. As illustrated in FIG. 1A, CNBUTS 100 includes five (5) groups of actors and six (6) types of components. The five groups of actors are: buyers/clients 110, marketplace suppliers 120, the universal transaction system operator 130, offering developers 140 and offer providers 150. The six types of components are: media interface 122 and 142, marketplace 124, the marketplace interface broker 132, the universal agent 134, the offering interface broker 136 and the offering system 144. The characteristics and roles of the various components of and actors involved in the CNBUTS 100 are described below.

CNBUTS 100 Components

The media interfaces 122, 142 are a set of tools enabling communication through one-way media (e.g. billboards, newspapers, radio, analog TV, etc.) and two-way media (e.g. Internet, mobile phones, digital TV, etc.). One-way communication media are used by buyers/clients 110 to get information from marketplaces 124, and two-way communication media are used between offer providers 150 and offering systems 144 as well as between buyers/clients 110 and marketplaces 124. In this regard, the media interfaces 142 operated by the offering developers 140 should provide for two-way communication, whereas the media interfaces 122 operated by the marketplace suppliers 120 may provide for one-way or two-way communication. Sets of tools are different for digital media and analog media. Tools for digital media include, for example, web applications, digital television (DTV) applications, mobile web applications, local applications (e.g., graphical user interfaces), and the like. Tools for analog media include, for example, graphics, texts, sounds, and the like.

The marketplace component 124 is a computer network enabled computer system where goods/services are available through media interfaces 122 to the buyers/clients 110. In this regard, marketplaces 124 may also be referred to herein as marketplace systems 124. The marketplace 124 offers goods/services available at the universal agent component 134 to the buyers/clients 110 and mediates within the transaction process of those goods/services between the universal agent 134 and the buyers/clients 110. The marketplace 124 is a separate computer system from the universal agent 134 and uses the marketplace interface broker component 132 to communicate with the universal agent 134.

The marketplace interface broker (MIB) 132 is a tool enabling integration of marketplaces 124 with the universal agent 134. The MIB 132 provides functionality dependent upon different kinds of marketplaces 124 (e.g. different technologies, different business domains, different business functionality, etc.) and the ability to be connected to the universal agent 134. The MIB 132 communicates with universal agent 134 through a computer network (not shown).

The universal agent 134 is a computer network enabled computer system capable of processing all kinds of transactions (e.g. buying, selling, renting, reserving, scheduling, etc.) of all kinds of goods/services on behalf of an offer provider 150 and the handling of those transactions between marketplace interface brokers 132 and offering interface brokers 136. In this regard, the universal agent 134 may also be referred to herein as the universal agent system 134. The universal agent 134 passes the goods/services offer from the offering systems 144 (placed there by offer providers 150) to the marketplaces 124 and informs offer providers 150 through the offering systems 144 about transaction requests from the marketplaces 124. The universal agent 134 is connected via a computer network (not shown) to one or more offering systems 144 (the number of service offering systems 144 is unlimited) using offering interface brokers 136 and to one or more marketplaces 124 (the number of marketplaces 124 is unlimited) using marketplace interface brokers 132. There is only one universal agent 134 in the CNBUTS 100 which is capable of serving every type of business domain.

The offering interface broker (OIB) 136 is a tool enabling integration of offering systems 144 with the universal agent 134. The OIB 136 provides functionality dependent upon different kinds of offering systems 144 (e.g. different technologies, different business domains, different logical approaches, etc.) and the ability to be connected to the universal agent 134. The OIB 136 communicates with the universal agent 134 through a computer network (not shown).

The offering system 144 is a computer network enabled computer system where goods/services are defined and managed by offer providers 150. In the CNBUTS 100 of FIG. 1A, offer providers 150 define and manage goods/services with an offering system 144 through media interfaces 142 (e.g. using web applications, DTV applications, mobile web applications, local applications). The offering system 144 makes goods/services offered by offer providers 150 available to the universal agent 134 and mediates in the transaction process of those goods/services between the universal agent 134 and the offer provider 150. The offering system 144 is a separate computer system from the universal agent 134 and uses the offering interface broker 136 to communicate with the universal agent 134.

CNBUTS Actors

The role of buyers/clients 110 is to buy/rent/reserve/schedule/etc. goods/services available on multiple marketplaces 124 through multiple media 122. Although two buyers/clients 110 are depicted in FIG. 1A, there are no limits on the number of buyers/clients 110 using CNBUTS 100.

The role of marketplace suppliers 120 is to provide marketplaces 124 in any area of perceived market need (e.g. computer shops, car shops, hair-dressers, ski rentals, hotels, etc.). Marketplace suppliers 120 use marketplace interface brokers 132 to integrate marketplaces 124 with the universal agent 134. One exemplary process of integrating marketplaces 124 with the universal agent 134 is described herein in connection with FIG. 3.

The marketplaces 124 can be unique (e.g. auto repair appointment reservations or auto parts purchase, etc.), linked (e.g. hotel, restaurant and rental car reservations) or universal (every registered offer provider, limited only by the parameters of the buyer/client search). Marketplace suppliers 120 also provide media interfaces 122 for communication between marketplaces 124 and buyers/clients 110. The media used for communication can be analog (e.g. newspapers, billboards, etc.) and/or digital (e.g. Internet, mobile phones, digital TV, etc.). It is a choice of marketplace suppliers 120 what communication possibilities and which media are available for buyers/clients 110. An unlimited number of marketplaces 124 can be created and an unlimited number of marketplace suppliers 120 can be involved in the CNBUTS 100.

The role of the universal agent supplier 130 is to provide the universal agent 134, which is responsible for exchanging information between offering systems 144 and marketplaces 124 in both directions and is responsible for completing transactions on behalf of an offer provider 150, if the offer provider 150 decides to delegate transaction handling to the universal agent 134.

The offering developers 140 utilize the offering interface broker 136 to develop and configure the offering system 144 for a specific category of goods/services (e.g. ski rental equipment reservations or ski equipment purchase), to define delegations to the universal agent 134, and to name specific existing marketplaces 124 where the offer will be available to the buyers/clients 110. One exemplary process of integrating offering systems 144 with the universal agent 134 is described herein in connection with FIG. 3.

The delegations to the universal agent 134 may be sufficient to allow the universal agent 134 to complete the transaction. The universal agent 134 may provide a universal service code (USC) associated with each good/service, which facilitates the use of one-way media for presenting those goods/services to the buyers/clients 110 on the marketplaces 124. However, a USC may not be required to use one-way media. In general, a USC is a unique sequence of letters, numerals, symbols or combination of letters, numerals and/or symbols that is associated with a particular good/service. USCs (in the context of reserving services) are more specifically described in a separate U.S. patent application filed contemporaneously herewith entitled "UNIVERSAL SERVICE CODE FOR RESERVATIONS" (which application claims priority from U.S. patent application Ser. No. 12/255, 383 filed Oct. 21, 2008 which application claims priority from U.S. Provisional Application No. 60/981,725 filed Oct. 22, 2007), the entire disclosure of which is incorporated by reference herein.

There can be an unlimited number of offering systems 144 categories and an unlimited number of offering developers 140 can be involved in the CNBUTS 100.

The role of offer providers 150 is to have an offer of goods/services, to give an access to those goods/services to the universal agent 134 and to handle transactions incoming from the universal agent 134 or (optionally) fully delegate transactions to the universal agent 134. Although two offer providers 150 are depicted in FIG. 1A, there are no limits on the number of offer providers 150 using CNBUTS 100.

CNBUTS Interactions

The CNBUTS 100 undertakes a number of actions/processes including, for example, offer construction, marketplace construction, and transaction processing.

CNBUTS Offer Construction

The offering developer 140 develops an offering system 144 and, by using the offering interface broker 136, integrates this offering system 144 with the universal agent 134. The offer provider 150 uses the offering system 144 to define goods/services, which will be available for transactions and describes those goods/services in the offering system 144 by defining their features such as, for example: price, needed resources, place, availability, etc. The offer provider 150 may also include information indicating whether the universal agent 134 is delegated authority to complete transactions relating to an offer of the goods/services. Using available features in the offering system 144, the offer provider 150 creates delegations by deciding which goods/service transactions will be handled by the offer provider 150 and which will be handled by the universal agent 134. When the offer provider 150 decides that the offer is ready, the offer provider 150 commands the offering system 144 to place the offer with the universal agent 134. The offering system 144 does not have to be connected permanently to the universal agent 134, but when not connected the goods/services without delegations will not be available to the buyers/clients 110. Goods/Services without delegations are available only when the offering system 144 is connected to the universal agent 134.

CNBUTS Marketplace Construction

The marketplace supplier 120, using the marketplace interface broker 132 integrates a given marketplace 124 with the universal agent 134. The marketplace supplier 120 chooses at least one business domain from the domains available in the universal agent 134 and develops at least one media interface 122 through which buyers/clients 110 will have an access to the goods/services from this domain. The marketplace 124 stays permanently connected through a computer network (not shown) with the universal agent 134 and presents to the buyers/clients 110 up to date offers with available goods/services only.

Transaction Processing

The buyer/client 110 gets the information about the offer and its availability on a marketplace 124 through a chosen media interface 122, which enables marketplace to buyer/client-directed communication. If this media interface 122 also supports a return communication channel (e.g., it is two-way), the buyer/client 110 uses it for completing the transaction for a chosen good/service. When the chosen media interface 122 does not have a return channel, the buyer/client 110 uses another available media interface 122 with return communication capabilities to complete this transaction. As the marketplace 124 stays connected to the universal agent 134, the transaction request is transmitted, over a computer network (not shown), immediately from the marketplace 124 to the universal agent 134. If the universal agent 134 was given delegation for the chosen goods/services, it accepts or refuses the transaction. If not, the universal agent 134 (over a computer network) informs the offering system 144 and the offer provider 150 about the transaction request. The offer provider 150 decides whether to accept it or refuse it. When the transaction status is set, the universal agent 134 (over a computer network) informs the marketplace 124 about this status and the marketplace 124 makes this information available to the buyer/client 110 through a given media interface 122.

Figure 2:
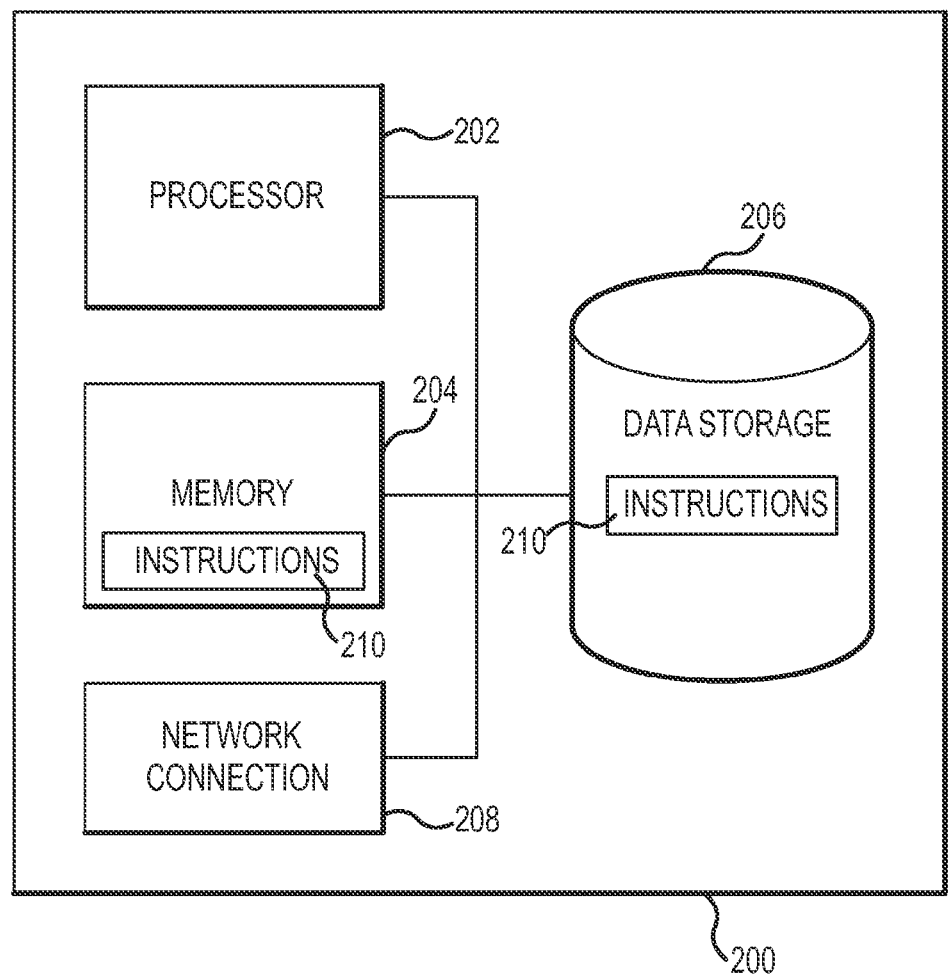
FIG. 2 is a block diagram showing the architecture of one example of a computing system that may be utilized in implementing various components of the computer network based universal transaction system.

Referring now to FIG. 2, one embodiment of an exemplary computing system 200 that may be utilized to implement one or more of the various components of the CNBUTS 100 is shown. For example, the universal agent 134, the offering systems 144, and the marketplaces 124 may be implemented using separate computing systems 200 such as depicted in FIG. 2. Computing system 200 depicted in FIG. 2 is not the only computing system architecture that be utilized to implement various components of CNBUTS 100 and differently configured computing systems or the like may be utilized. Further, multiple computing systems 200 such as depicted in FIG. 2 may be utilized to implement a single component within the CNBUTS 100. For example, the universal agent 134, an offering system 144 and/or a marketplace system 124 may comprise two or more computing systems 200 in communication with one another via, for example, a local area network (LAN) connection.

Computing system 200 includes, among other components, a processor 202, memory 204, a data storage device 206 (e.g., a hard drive), and a network connection device 208 (e.g., an Ethernet card, a WiFi network card, a modem or the like). Computing system 200 may include additional components that are not illustrated in FIG. 2 including, for example, a power supply, an input device (e.g., a keyboard, a pointing device), and an output device (e.g., a display). The processor 202 executes computer program instructions 210 stored in memory 204 and/or on the data storage device 206 that enable the computing system 200 to provide the desired functionality of the component within the CNBUTS 100 that computing system 200 is being used to implement.

The computer program instructions 210 may, for example in the case of computing system 200 being used to implement a marketplace 124, include instructions to provide the various functionalities of the marketplace 124 including offering goods/services available at the universal agent 134 to the buyers/clients 110 via the media interfaces 122 and mediating in the transaction process of such goods/services between the universal agent 134 and the buyers/clients 110. In this regard, the computer program instructions 210 executable by the processor 202 of the computing system 200 may also implement some portion or the entirety of the marketplace interface broker 132 corresponding with the marketplace 124.

The computer program instructions 210 may, for example in the case of computing system 200 being used to implement the universal agent 134, include instructions enabling the computing system 200 to provide the various functionalities of the universal agent 134 including passing goods/services offers from the offering systems 144 to the marketplaces 124, informing offer providers 150 through the offering systems 144 about transaction requests from the marketplaces 124, and processing (when delegated authority) on behalf of the offer providers 150 all kinds of transactions by buyers/clients 110 of all kinds of goods/services. In this regard, the computer program instructions 210 executable by the processor 202 of the computing system 200 may also implement some portion or the entirety of the marketplace interface brokers 132 and the offering interface brokers 136.

The computer program instructions 210 may, for example in the case of computing system 200 being used to implement an offering system 144, include instructions to provide the various functionalities of the offering system 144 including enabling offer providers 150 to define and manage goods/services through media interfaces 142, making the goods/services offered by service providers 150 available to the universal agent 134, and mediating in the transaction process between the universal agent 134 and the offer providers 150. In this regard, the computer program instructions 210 executable by the processor 202 of the computing system 200 may also implement some portion or the entirety of the offering interface broker 136 corresponding with the offering system 144.

Figure 3:
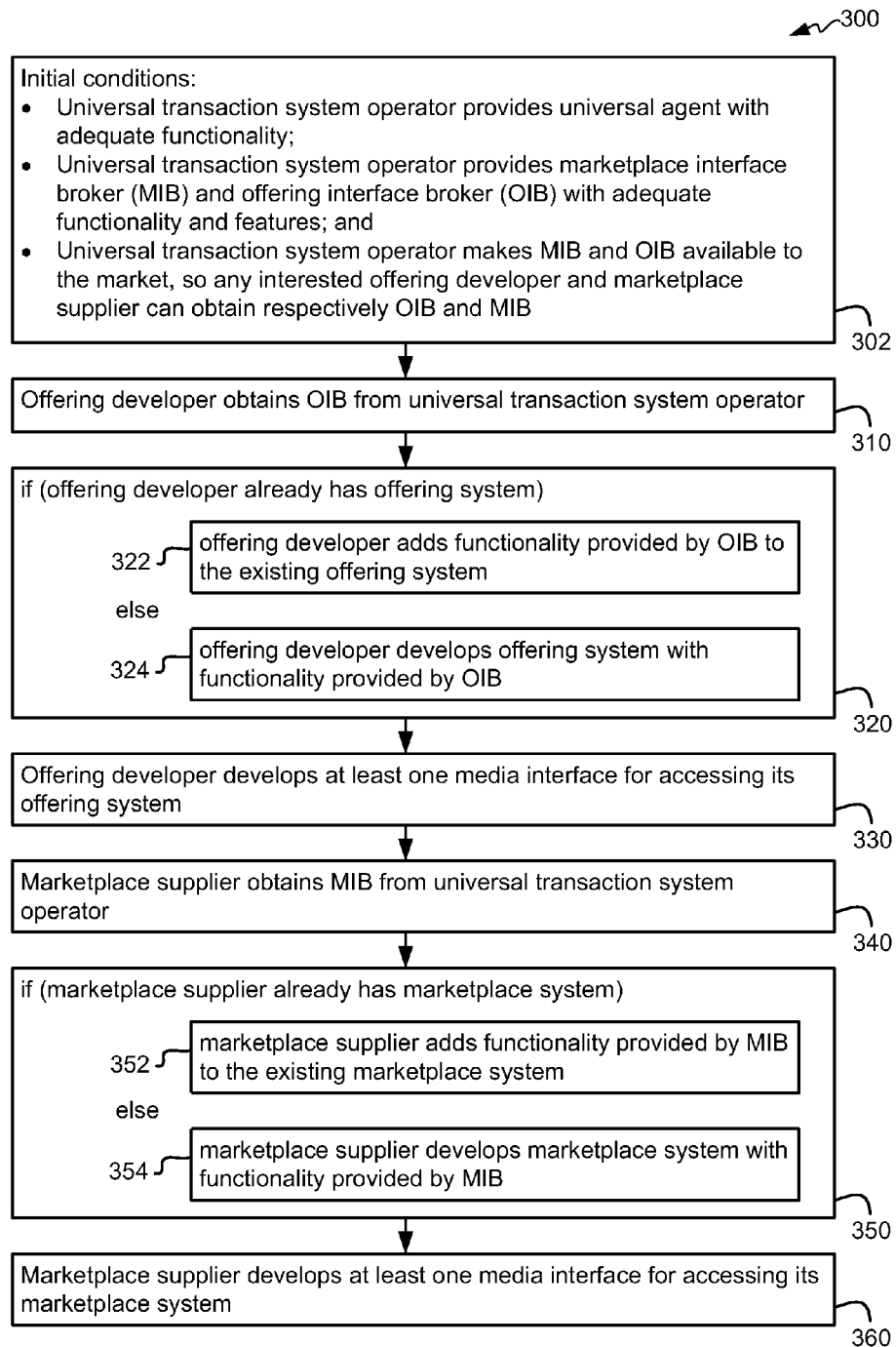
FIG. 3 shows one embodiment of a computer network based universal transaction system development process.

Referring now to FIG. 3, one embodiment of a process 300 of developing a CNBUTS is illustrated. The CNBUTS development process 300 combines interactions of three (3) groups of actors and six (6) component types (see FIG. 1A). Component types used in this process include:

A media interface 122, 142 is a set of all tools (e.g. php-html scripts, OpenTV applications, etc.) needed to support buyer/client 110 to marketplace 124, marketplace 124 to buyer/client 110, offer provider 150 to offering system 144, and offering system 144 to offer provider 150 directed communication through digital media (e.g. mobile phone with an Internet browser, PC with an Internet browser, etc.). The media interface 122 is also a set of tools (e.g. graphics, texts, etc.) needed to enable marketplace 124 to buyer/client 110 directed communication through analog media (e.g. billboards, newspapers, etc.).

A marketplace 124 is a computer network enabled computer system where goods/services are available through media interfaces 122 to the buyers/clients 110. In this regard, marketplaces 124 may also be referred to herein as marketplace systems 124.

A marketplace interface broker (MIB) 132 is a tool integrating marketplaces 124 with a universal agent 134. The MIB 132 provides functionality enabling different kinds of marketplaces 124 to be connected to the universal agent 134.

A universal agent 134 is a computer network enabled computer system capable of processing transactions of goods/services on behalf of an offer provider 150 and handling transactions between marketplace interface brokers 132 and offering interface brokers 136. In this regard, the universal agent 134 may also be referred to herein as the universal agent system 134. The universal agent 134 is connected via a computer network (not shown) to one or more offering systems 144 using offering interface brokers 136 and to marketplaces 124 using marketplace interface brokers 132.

An offering interface broker (OIB) 136 is a tool integrating offering systems 144 with the universal agent 134. The OIB 136 provides functionality enabling different kinds of offering systems 144 to be connected to the universal agent 134.

An offering system 144 is a computer network enabled computer system where goods/services are defined and managed by offer providers 150 through media interfaces 142.

The actors cooperating in the process of developing CNBUTS include:

A universal transaction system operator 130 that is the provider of three components: the universal agent 134, the marketplace interface broker 132 and the offering interface broker 136.

A marketplace supplier 120 that is the developer of one or more marketplaces 124 and one or more media interfaces 122.

An offering developer 140 that is the developer of one or more offering systems 144 and one or more media interfaces 142.

CNBUTS development may proceed in accordance with a process 300 such as depicted in FIG. 3. When the CNBUTS development process begins, there are several initial conditions 302 including: (1) the universal transaction system operator 130 provides the universal agent 134 with adequate functionality; (2) the universal transaction system operator 130 provides the MIB 132 and the OIB 136 with the adequate functionality and features; and (3) the universal transaction system operator 130 makes the MIB 132 and the OIB 136 available to the market, so any interested offering developer 140 and marketplace supplier 120 can obtain, respectively, the OIB 136 and the MIB 132.

With the initial conditions 302 satisfied, one embodiment of the CNBUTS development process 300 proceeds in the following manner. In a first step 310, the offering developer 140 obtains the OIB 136 from the universal transaction system operator 130. In a second step 320 the offering developer undertakes one of two sub-steps. If the offering developer 140 already has an offering system 144, the offering developer 140 undertakes sub-step 322 wherein the offering developer 140 adds functionality provided by the OIB 136 to the existing offering system 144; else, the offering developer 140 undertakes sub-step 324 wherein the offering developer 140 develops an offering system 144 with functionality provided by the OIB 136. In a third step 330, the offering developer 140 develops at least one media interface 142 for accessing its offering system 144.

In a fourth step 340, the marketplace supplier 120 obtains the MIB 132 from the universal transaction system operator 130. In a fifth step 350, the marketplace supplier 120 undertakes one of two sub-steps. If the marketplace supplier 120 already has a marketplace system 124, the marketplace supplier 120 undertakes sub-step 352 wherein the marketplace supplier 120 adds functionality provided by the MIB 132 to the existing marketplace system 124; else, the marketplace supplier 120 undertakes sub-step 354 wherein the marketplace supplier 120 develops the marketplace system 124 with functionality provided by the MIB 132. In a sixth step 360, the marketplace supplier 120 develops at least one media interface 122 for accessing its marketplace system 120.

In other embodiments of the CNBUTS development process, the order of one or more of the aforementioned steps (310-360) may be arranged in a different manner. For example, steps undertaken by the offering developer 140 (e.g., steps 310-330) may proceed in parallel with the steps undertaken by the marketplace supplier 120 (e.g., steps 340-360) or after the steps undertaken by the marketplace supplier 120. Regardless of the order in which the steps are arranged, the CNBUTS 100 starts to work at its full functionality when at least one offering developer 140 and at least one marketplace supplier 120 fulfill their respective activities of the CNBUTS development process 300.

Ownership of CNBUTS

Actors (e.g., the universal transaction system operator 130, marketplace suppliers 120 and offering developers 140) participating in development of CNBUTS 100 partially own the system 100 by owning its specified elements. Three groups of actors and their components are listed below:

The universal transaction system operator 130 owns the universal agent system 134, the offering interface broker 136 and the marketplace interface broker 132, Each offering developer 140 owns at least one offering system 144 and at least one media interface 142, and Each marketplace supplier 120 owns at least one marketplace system 124 and at least one media interface 122.

While there is only one universal transaction system operator 130, the number of offering developers 140 and marketplace suppliers 120 participating in developing a CNBUTS 100 is not limited.

Roles and Responsibilities

The role of the universal transaction system operator 130 in the CNBUTS development process 300 includes:

supplying marketplace suppliers 120 and offering developers 140, respectively, with MIBs 132 and OTBs 136;

assuring error-free and secure communication between provided MIBs 132 and OTBs 136;

providing the universal agent 134 which will operate efficiently and reliably; and providing the functionality that satisfies marketplace suppliers 120 and offering developers 140 needs according to the CNBUTS 100.

The role of marketplace suppliers 120 includes:

building marketplaces 124 in any area of perceived market need (e.g. auto parts, hair-dressers, ski rentals, hotels, etc.);

establishing the tailored user interfaces for marketplaces 124;

linking or excluding goods/service domains in order to improve the buyer/client experience on a given marketplace 124; and providing access to marketplaces 124 to the buyers/clients 110 through required analog and digital media by media interfaces 122 (e.g. newspapers, billboards, cell phones, WWW sites, digital TV applications, etc.).

The role of offering developers 140 includes:

building offering systems 144 in any perceived need business domain (e.g. computer sales, auto parts, hair-dressers, ski rentals, hotels, etc.);

establishing the tailored user interfaces for offering systems 144;

developing offer provider's 150 transaction delegations within offering systems 144;

developing functionality of assigning offer provider's 150 offer to a unique universal service code;

linking to offering systems 144 any other domain-specific tools (e.g. patient medical records, restaurant table configuration, etc.); and providing access to offering systems 144 to the offer providers 150 through required digital media by media interfaces 142 (e.g. cell phone applications, WWW applications, digital TV applications, computer network enabled local applications, etc.).

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A computer network based universal transaction system enabling one or more customers to conduct transactions with one or more offer providers, wherein the transactions relate to wares offered by the offer providers, said system comprising:

a universal agent system including at least one processor, at least one computer network connection and computer program instructions executable by said at least one processor included in said universal agent system that enable said universal agent system to receive one or more offers of wares available for transaction via the at least one computer network connection included in the universal agent system, wherein said universal agent system is operated by a universal agent supplier;

one or more offering systems, each said offering system including at least one processor, at least one computer network connection and computer program instructions executable by said at least one processor included in said offering system that enable offer providers to define one or more offers of wares available for transaction with customers and make the one or more offers of wares available to the universal agent via the at least one computer network connection included in said offering system, wherein an offer of wares includes a delegation by the offer provider that specifies whether said universal agent system is delegated authority to complete transactions with customers relating to the offer of wares, and wherein said one or more offering systems are operated by one or more offer providers comprising one or more individuals or entities separate from said universal agent supplier;

one or more offering interface brokers, each said offering interface broker corresponding with one of said one or more offering systems and being a computer-implemented tool enabled to connect said corresponding offering system with said universal agent system for communication there between via a computer network, each said offering interface broker comprising computer program instructions executable by at least one of said at least one processor included in said universal agent system and said at least one processor included in said corresponding offering system;

one or more marketplace systems, each said marketplace system being associated with a marketplace and including at least one processor, at least one computer network connection and computer program instructions executable by said at least one processor included in said marketplace system that enable said marketplace system to receive via the at least one computer network connection the one or more offers of wares from said universal agent system, present the customers the one or more offers of wares, receive transaction requests from the customers relating to the one or more offers of wares, and communicate received transaction requests to said universal agent system, wherein said one or more marketplace systems are operated by one or more marketplace suppliers comprising one or more individuals or entities separate from said universal agent supplier; and one or more marketplace interface brokers, each said marketplace interface broker corresponding with one of said one or more marketplace systems and being a computer-implemented tool enabled to connect said corresponding marketplace system with said universal agent system for communication there between via a computer network, each said marketplace interface broker comprising computer program instructions executable by at least one of said at least one processor included in said universal agent system and said at least one processor included in said corresponding marketplace system;

wherein said computer program instructions executable by said at least one processor of said universal agent system further enable said universal agent system to conduct a transaction process wherein said universal agent system communicates the one or more offers of wares from said one or more offering systems to said one or more marketplace systems to provide a connection among the offer providers and marketplaces by which marketplaces are provided schedulable time periods relating to wares from multiple offer providers and wherein said universal agent system processes transaction requests received from said one or more marketplace systems to transform the requests into transactions for delivery of wares by the offer providers to the customers.

2. The system of claim 1 further comprising:

at least one media interface providing two-way communication between said one or more marketplace systems and the customers, wherein the offers of wares available for transaction are communicated from said one or more marketplace systems to the customers via said at least one media interface.

3. The system of claim 2 wherein the transaction requests are communicated from the customers to said one or more marketplace systems via the same said at least one media interface.

4. The system of claim 2 further comprising:

at least one additional media interface providing at least return channel communication from the customers to said one or more marketplace systems, wherein the transaction requests are communicated from the customers to said one or more marketplace systems via said at least one additional media interface.

5. The system of claim 1 further comprising:

at least one media interface enabling two-way communication between said one or more offering systems and the offer providers, wherein the at least one media interface enables operation of said one or more offering systems by the offer providers to define offers of wares available for transaction.

6. The system of claim 1 wherein the offer providers directly control operation of said one or more offering systems to define offers of wares available for transaction.

7. The system of claim 1 wherein said computer program instructions of universal agent system enable said universal agent system to complete transaction requests received from said one or more marketplace systems for offers of wares including information indicating that said universal agent system is delegated authority to complete transactions.

8. The system of claim 1 wherein at least one offer of wares includes information indicating that said universal agent system is not delegated authority to complete transactions relating thereto, and wherein said computer program instructions of said universal agent system enable said universal agent system to inform the offer providers about the transaction requests for which said universal agent system is not delegated authority to complete through said one or more offering systems.

9. The system of claim 1 wherein said system includes only a single universal agent system communicating offers of wares from a plurality of offering systems to a plurality of marketplace systems and processing transaction requests received from said plurality of marketplace systems.

10. The system of claim 1 wherein a ware offered by the one or more offer providers comprises a service.

11. The system of claim 1 wherein a ware offered by the one or more offer providers comprises a good.

12. The system of claim 1 wherein a ware offered by the one or more offer providers comprises a combination of a good and a service.

13. A method for facilitating transactions of wares between customers and offer providers, said method comprising the steps of:
   (a) conducting an offer construction process involving one or more offer providers and a universal agent supplier, wherein the one or more offer providers offer wares available for transaction with customers using one or more offering systems operated by the one or more offer providers comprising one or more individuals or entities separate from said universal agent supplier, wherein the universal agent supplier provides a universal agent system to which offers of wares are communicated and also provides an offering interface broker corresponding with each said offering system and being a computer-implemented tool enabled to connect said corresponding offering system with said universal agent system for communication there between via a computer network, wherein each said offering system includes at least one processor, at least one computer network connection and computer program instructions executable by said at least one processor included in the offering system, and wherein the universal agent system includes at least one processor, at least one computer network connection and computer program instructions executable by said at least one processor included in said universal agent system that enable said universal agent system to receive the offers of wares via the computer network connection, wherein said offering interface broker comprises computer program instructions executable by at least one of said at least one processor included in said universal agent system and said at least one processor included in said corresponding offering system, and wherein said step of conducting an offer construction process comprises executing computer program instructions that enable the processors of the universal agent system and each said offering system to:
      (i) define one or more offers of wares available for transaction with customers, wherein the one or more offers are defined by the one or more offer providers and are included in one or more business domains;
      (ii) create delegations by the one or more offer providers related to the one or more offers, wherein a delegation specifies whether the universal agent has authority on behalf of an offer provider to complete a transaction relating to an offer; and
      (iii) place the one or more offers and related delegations with the universal agent;
   (b) conducting a marketplace construction process involving one or more marketplace suppliers and the universal agent supplier, wherein the one or more marketplace suppliers provide one or more marketplace systems operated by the one or more marketplace suppliers comprising one or more individuals or entities separate from said universal agent supplier and one or more media providing two-way communication between the one or more marketplace systems and the customers, wherein the universal agent supplier provides one or more marketplace interface brokers with each said marketplace interface broker corresponding with one of said one or more marketplace systems and being a computer-implemented tool enabled to connect said corresponding marketplace system with said universal agent system for communication there between via a computer network, and wherein each said marketplace system is associated with a marketplace and includes at least one processor, at least one computer network connection and computer program instructions executable by said at least one processor included in said marketplace system that enable said marketplace system to receive via the at least one computer network connection the offers of wares from said universal agent system, present the customers the offers of wares, receive transaction requests from the customers relating to the offers of wares, and communicate received transaction requests to said universal agent system, and wherein each said marketplace interface broker comprises computer program instructions executable by at least one of said at least one processor included in said universal agent system and said at least one processor included in said corresponding marketplace system; and
   (c) conducting a transaction process wherein a single universal agent operating separately from the one or more marketplace systems and the one or more offering systems provides a connection among the one or more offering systems and the one or more marketplace systems by which the one or more marketplace systems are provided information relating to the wares from multiple offer providers and processes transaction requests from customers relating to wares offered by the one or more offer providers on the one or more marketplace systems and presented to the customers through the one or more media to transform the requests into transactions for delivery of wares by the offer providers to the customers.

14. The method of claim 13 wherein said step of conducting a marketplace construction process comprises executing computer program instructions that enable the processors of the universal agent system and marketplace system to:
   (i) establish communication between the one or more marketplaces and the universal agent system;
   (ii) receive information about business domains available to the universal agent system;

(iii) select at least one business domain; and
(iv) provide information from the one or more marketplaces through the one or more media to customers about the offers available in the at least one business domain.

15. The method of claim 14 wherein said step of conducting a transaction process comprises executing computer program instructions that enable the processors of the universal agent system, marketplace system and offering system to:
   (i) receive at a marketplace a transaction request from a customer relating to an offer of wares defined by an offer provider;
   (ii) transmit the transaction request from the marketplace to the universal agent;
   (iii) complete the transaction request at the universal agent when the universal agent is delegated authority by the offer provider to complete transactions relating to the offer of wares; and
   (iv) inform the offer provider of the transaction request when the universal agent is not delegated authority by the offer provider to complete transactions relating to the offer of wares.

16. The method of claim 13 wherein said step of conducting a transaction process comprises executing computer program instructions that enable the processors of the universal agent system, marketplace system and offering system to:
   (i) receive at a marketplace a transaction request from a customer relating to an offer of wares defined by an offer provider;
   (ii) transmit the transaction request from the marketplace to the universal agent;
   (iii) complete the transaction request at the universal agent when the universal agent is delegated authority by the offer provider to complete transactions relating to the offer of wares; and
   (iv) inform the offer provider of the transaction request when the universal agent is not delegated authority by the offer provider to complete transactions relating to the offer of wares.

17. The method of claim 13 wherein said step of conducting a marketplace construction process comprises executing computer program instructions that enable the processors of the universal agent system and marketplace system to:
   (i) establish communication between the one or more marketplaces and the universal agent;
   (ii) receive information about business domains available to the universal agent;
   (iii) select at least one business domain; and
   (iv) provide information from the one or more marketplaces through the one or more media to customers about the offers available in the at least one business domain.

18. The method of claim 17 wherein said step of conducting a transaction process comprises executing computer program instructions that enable the processors of the universal agent system, marketplace system and offering system to:
   (i) receive at a marketplace a transaction request from a customer relating to an offer of wares defined by an offer provider;
   (ii) transmit the transaction request from the marketplace to the universal agent;
   (iii) complete the transaction request at the universal agent when the universal agent is delegated authority by the offer provider to complete transactions relating to the offer of wares; and
   (iv) inform the offer provider of the transaction request when the universal agent is not delegated authority by the offer provider to complete transactions relating to the offer of wares.

19. The method of claim 13 wherein said step of conducting a transaction process comprises executing computer program instructions that enable the processors of the universal agent system, marketplace system and offering system to:
   (i) receive at a marketplace a transaction request from a customer relating to an offer of wares defined by an offer provider;
   (ii) transmit the transaction request from the marketplace to the universal agent;
   (iii) complete the transaction request at the universal agent when the universal agent is delegated authority by the offer provider to complete transactions relating to the offer of wares; and
   (iv) inform the offer provider of the transaction request when the universal agent is not delegated authority by the offer provider to complete transactions relating to the offer of wares.

20. The method of claim 13 wherein an individual or entity acting as the universal agent supplier is separate from each individual or entity acting as a customer.

21. The method of claim 13 wherein a ware offered by the one or more offer providers comprises a service.

22. The method of claim 13 wherein a ware offered by the one or more offer providers comprises a good.

23. The method of claim 13 wherein a ware offered by the one or more offer providers comprises a combination of a good and a service.

* * * * *